(12) United States Patent
Bevilaqua et al.

(10) Patent No.: US 11,817,753 B2
(45) Date of Patent: Nov. 14, 2023

(54) LOW VIBRATION ELECTRIC MOTOR

(71) Applicant: FISHER & PAYKEL APPLIANCES LIMITED, Auckland (NZ)

(72) Inventors: Matheus Alexandre Bevilaqua, Auckland (NZ); James Elliott Cameron, Auckland (NZ); Hai Lan, Auckland (NZ)

(73) Assignee: FISHER & PAYKEL APPLIANCES LIMITED

( * ) Notice: Subject to any disclaimer, the term of this patent is extended or adjusted under 35 U.S.C. 154(b) by 0 days.

(21) Appl. No.: 17/628,264

(22) PCT Filed: Jul. 8, 2020

(86) PCT No.: PCT/IB2020/056396
§ 371 (c)(1),
(2) Date: Jan. 19, 2022

(87) PCT Pub. No.: WO2021/014251
PCT Pub. Date: Jan. 28, 2021

(65) Prior Publication Data
US 2022/0271637 A1    Aug. 25, 2022

(30) Foreign Application Priority Data
Jul. 19, 2019    (NZ) ........................................ 755557

(51) Int. Cl.
*H02K 21/02*    (2006.01)
*H02K 1/17*    (2006.01)
*H02K 1/2753*    (2022.01)
*H02K 7/14*    (2006.01)
*H02K 21/16*    (2006.01)

(52) U.S. Cl.
CPC ............. *H02K 21/025* (2013.01); *H02K 1/17* (2013.01); *H02K 1/2753* (2013.01); *H02K 7/14* (2013.01); *H02K 21/16* (2013.01); *H02K 2201/03* (2013.01)

(58) Field of Classification Search
CPC ...... H02K 21/025; H02K 1/17; H02K 1/2753; H02K 7/14; H02K 21/16
USPC ............................................. 310/156.43, 191
See application file for complete search history.

(56) References Cited

U.S. PATENT DOCUMENTS

| | | | |
|---|---|---|---|
| 2004/0245878 A1* | 12/2004 | Kim ....................... | H02K 21/16 310/114 |
| 2011/0012463 A1* | 1/2011 | Duncan .................. | H02K 15/03 310/156.43 |
| 2012/0299429 A1 | 11/2012 | Choi et al. | |
| 2017/0194825 A1 | 7/2017 | Nestler | |

FOREIGN PATENT DOCUMENTS

DE    102011004950 A1 *    9/2012    ............... H02K 1/27

* cited by examiner

*Primary Examiner* — Jose A Gonzalez Quinones
(74) *Attorney, Agent, or Firm* — Clark Hill PLC; James R. Foley

(57) ABSTRACT

An electric motor having low vibration and/or noise comprises a rotor or stator comprising permanent magnets each comprising at least two pole pairs, with an internal flux gap within the permanent magnets between adjacent internal pole pairs. The internal flux gap between the internal pole pairs may be similar to an external pole to pole physical spacing between adjacent poles of adjacent magnets. The motor is suitable for use in for example a laundry washing machine or dryer or washer-dryer.

13 Claims, 3 Drawing Sheets

LOW VIBRATION ELECTRIC MOTOR

This application is a National Phase Filing of PCT/IB2020/056396, having an International filing date of Jul. 8, 2020, which claims priority of New Zealand Patent Application No. 755557, filed Jul. 19, 2019. The disclosure of the foregoing are hereby incorporated by reference.

TECHNICAL FIELD

The invention relates to an electric motor having low vibration and/or noise, which is suitable for use in for example a laundry washing machine or dryer or washer-dryer.

BACKGROUND

Vibration in operation of an electric motor is undesirable and can lead to noise, and low vibration and noise is an important requirement for electric motors in most applications, so that the motor or a machine powered by the motor, such as for example a laundry machine, operates with as little vibration and as silently as possible.

Electric motors very commonly comprise permanent magnets, and coils (electro-magnets). Multiple pole pair permanent magnets can be used in electric motors as a lower cost alternative to using a greater number of permanent magnets each comprising a single pair of N-S poles. However the use of multi pole pair magnets can lead to additional vibration and possibly noise in operation of the motor relative to the use of single pole pair magnets.

SUMMARY OF INVENTION

In broad terms in one aspect the invention comprises an electric motor comprising a rotor or stator comprising permanent magnets each comprising at least two pole pairs, wherein the multiple pole pair permanent magnets comprise an internal flux gap within the permanent magnets between adjacent internal pole pairs.

In at least some embodiments the internal flux gap within the permanent magnets between the internal pole pairs is similar to an external pole to pole physical spacing between adjacent poles of adjacent magnets.

In at least some embodiments the internal flux gap within the multiple pole pair permanent magnets between the internal pole pairs is in the range about 1 micron to about 3 mm, 10 microns to 2 mm, or 50 or 100 microns to 1 mm.

In at least some embodiments there is substantially no external pole to pole physical spacing between adjacent poles of the permanent magnets.

In broad terms in another aspect the invention comprises a method for manufacturing which comprises producing the rotor or stator of the electric motor so as to incorporate:
- multiple pole pair permanent magnets comprising an internal flux gap within the permanent magnets between the internal pole pairs, and/or
- multiple pole pair permanent magnets mounted so that an external pole to pole physical spacing between adjacent poles of adjacent magnets is similar to the internal flux gap within the permanent magnets between the internal pole pairs.

In broad terms in a further aspect the invention comprises a laundry machine i.e. laundry washing machine or dryer or washer-dryer, including the electric motor as above or produced by the manufacturing method above.

In this specification the term "comprising" means "consisting at least in part of". When interpreting a statement in this specification and claims that includes "comprising", features other than that or those prefaced by the term may also be present. Related terms such as "comprise" and "comprises" are to be interpreted similarly.

BRIEF DESCRIPTION OF DRAWINGS

The invention is further described with reference to the accompanying drawings, in which.

DESCRIPTION OF EMBODIMENTS

Figure 1:
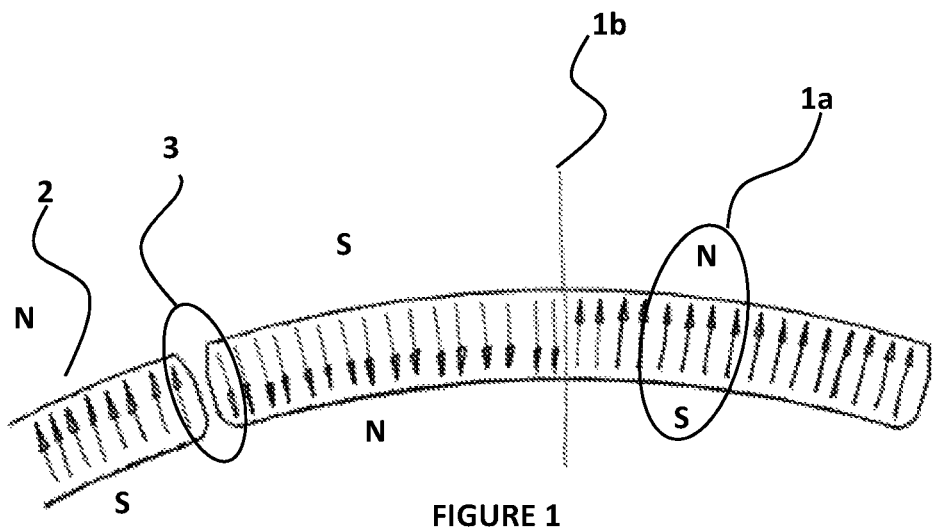
FIG. 1 diagrammatically shows a peripheral part of a rotor of an electric motor comprising two pole pair magnets.

FIG. 1 diagrammatically shows a peripheral part of a rotor of a prior art electric motor comprising two pole pair magnets i.e. each physical magnet on the rotor comprises two N-S pole pairs. One N-S pole pair is circled at 1a. Magnet 1 and part of magnet 2 are shown. The pole-to-pole spacing between the two N-S pole pairs on each physical magnet is very small. For magnet 1 the pole-to-pole spacing between the two N-S pole pairs is indicated at 1b in FIG. 1. The pole-to-pole spacing between the adjacent poles of the physical magnets depends on the physical spacing of the magnets at manufacture. The pole-to-pole spacing between the adjacent poles of the magnets 1 and 2 in FIG. 1 is indicated at 3. The magnetic flux between rotor magnetic pole pairs is different inside the magnet and in the gap space between physical magnets.

Figure 2:
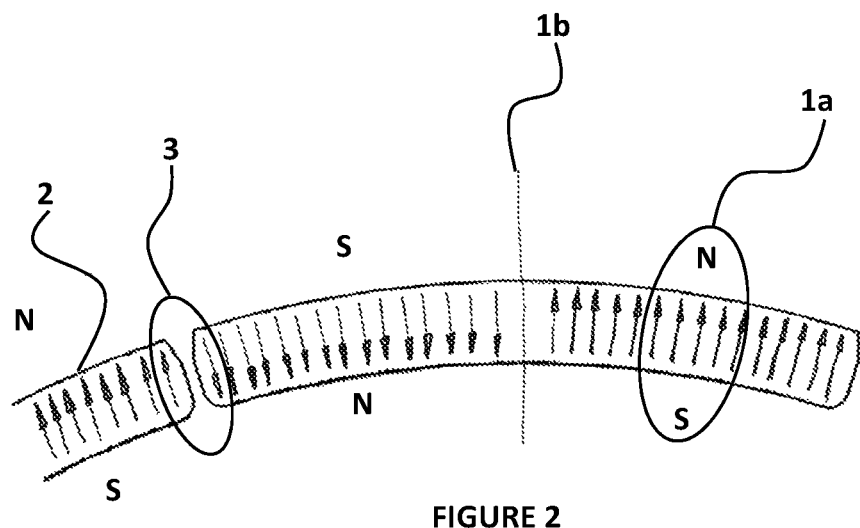
FIG. 2 diagrammatically shows an equivalent peripheral part of another rotor of an electric motor comprising two pole pair magnets.

FIG. 2 diagrammatically shows an equivalent peripheral part of a rotor of an electric motor of the invention, comprising two pole pair magnets. The physical magnets 1 and 2 (and all physical magnets around the rotor) comprise an internal flux gap within the permanent magnets between the internal pole pairs—compare FIGS. 1 and 2 at 1b.

Ideally the physical magnets 1 and 2 (and all physical magnets around the rotor) are mounted on the rotor or otherwise carried by the rotor so that the pole to pole physical spacing 3 between adjacent multi pole pair magnets 1 and 2 (and all physical magnets around the rotor) is similar to the internal flux gap 1b within the multi pole pair permanent magnets. Thus the magnetic flux between rotor magnetic pole pairs is similar inside the magnets and in the gap spaces between the physical magnets.

Where there is no flux gap between the magnetic pole pairs inside the magnets and the gap spaces between the physical magnets is relatively large, then the significant non-uniform flux distribution in the gap space between physical magnets relative to within each magnet, causes a "cogging" torque ripple, which in turn leads to vibration and possibly noise in operation of the motor. Where each physical magnet on the rotor comprises two N-S pole pairs, this vibration has a frequency of 3 times the motor electrical frequency. Where as in a laundry machine for example, the motor drives rotation of a larger body, such as the drum of a laundry washing machine or dryer or washer-dryer, this can also cause consequential vibration and noise in rotation of the driven larger body such as the drum. At a certain rotational speed, the cogging torque frequency can be close to the natural resonant frequency of the machine of which the electric motor is a part, such as the natural resonant frequency of a laundry machine, which can in turn generate significant audible noise. In the motor of the invention, of FIG. 2 in particular, the uniform or near uniform flux distribution in the gap space between physical magnets relative to within each magnet, avoids, minimizes, or at least reduces this cogging torque ripple, which in turn avoids, minimizes, or reduces vibration and noise in operation of the motor or machine.

In at least some embodiments, the distribution of magnetic domains inside the permanent magnets is controlled during the magnet manufacturing, to create a "flux gap" inside the magnets, between pole pairs, that will match the size of the physical gap between the physical magnets during subsequent motor manufacture.

Figure 3:
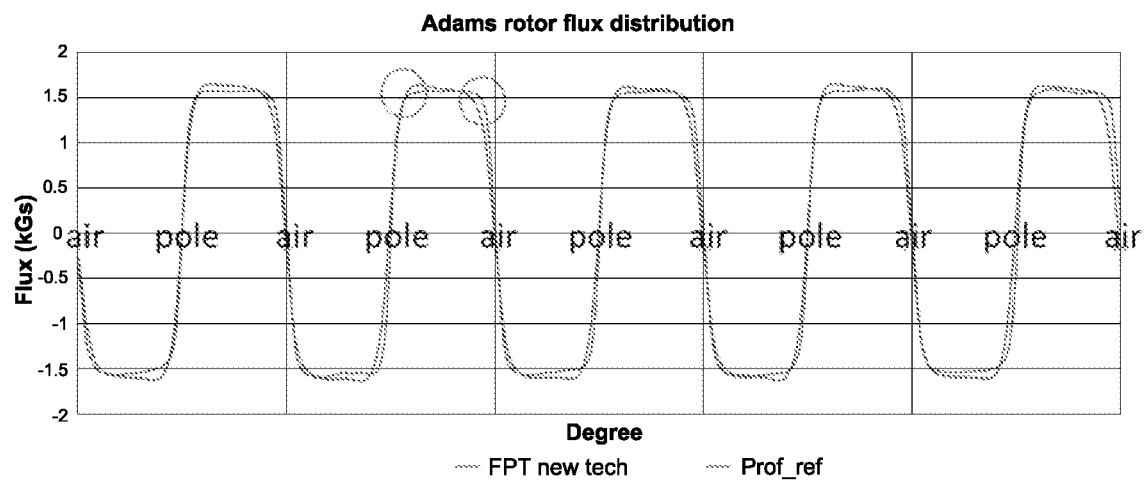
FIG. 3 shows the flux distributions around one rotor comprising two pole pair magnets—red line, and another rotor comprising two pole pair magnets—grey line.
Figure 4:
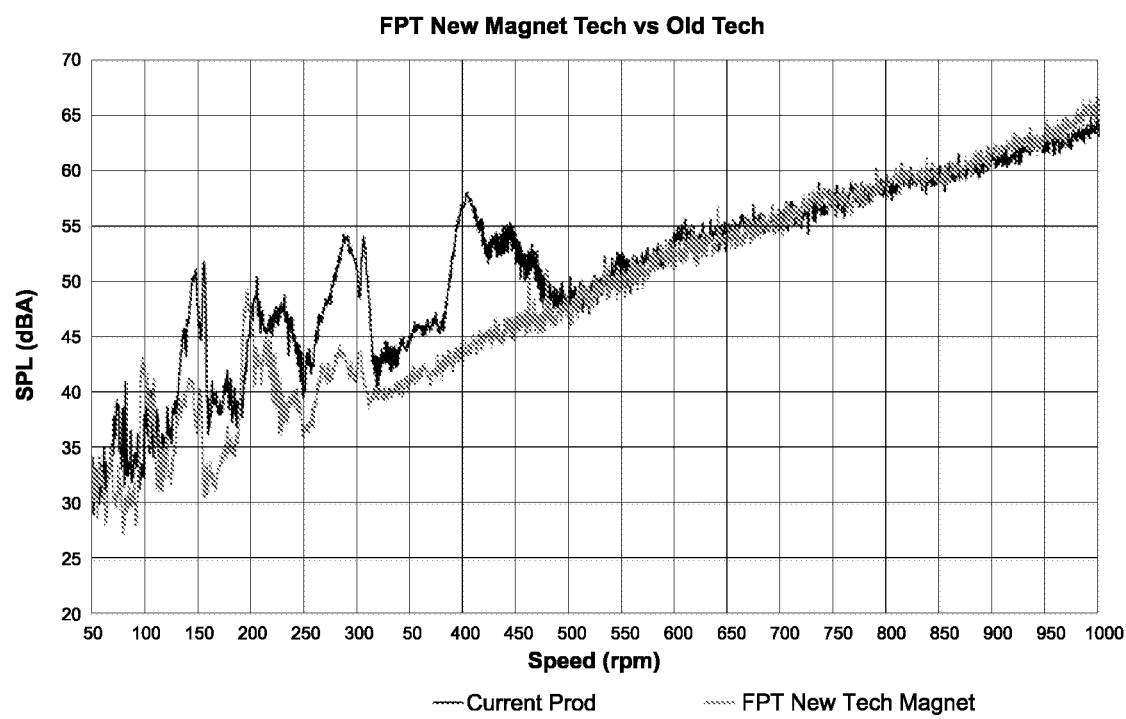
FIG. 4 plots acoustic noise against motor rotational speed for one motor with a rotor comprising two pole pair magnets—black line, and another motor with a rotor comprising two pole pair magnets—green line.

FIG. 3 shows the flux distribution around a rotor comprising two pole pair magnets there is a significant dissimilarity between the flux gap between the magnetic pole pairs inside the magnets and the gap spaces between the physical magnets, thus significant asymmetric flux distribution—red line, and the flux distribution around a rotor according to the invention comprising two pole pair magnets—grey line. The motor cogging torque, and vibration and any resulting audible noise, are proportional to the degree of asymmetry in the flux distribution of each magnetic pole. Where the flux distribution is significantly asymmetric—red line, motor cogging torque and vibration may be significant, and may also lead to audible noise. In the motor of the invention the flux distribution of each magnetic pole is symmetric or more symmetric—grey line, and motor cogging torque, and vibration and any resulting audible noise, are eliminated or minimized or reduced. FIG. 4 plots noise against motor speed for a motor with a rotor comprising two pole pair magnets where the flux distribution is significantly asymmetric—black line, and a motor with a rotor according to the invention also comprising two pole pair magnets—green line, in a washing machine application.

The motor may be an electric motor in any form, with permanent magnets. For example the motor may be a permanent magnet synchronous motor (PMSM), either a radial flux—permanent magnet synchronous motor—the magnetic flux path is oriented radially (PMSM-RF motor) or an axial flux permanent magnet synchronous motor—the magnetic flux path is oriented axially (PMSM-AF motor). Alternatively the motor may be a DC brushed or brushless motor (DCBM) with permanent magnets. The motor may have an external or internal rotor carrying the permanent magnets. The motor may be a direct drive electric motor namely a motor in which the motor directly drives a shaft without a belt or other form of motion transmission device between the rotor and shaft, or an indirect drive motor.

Figure 5A:
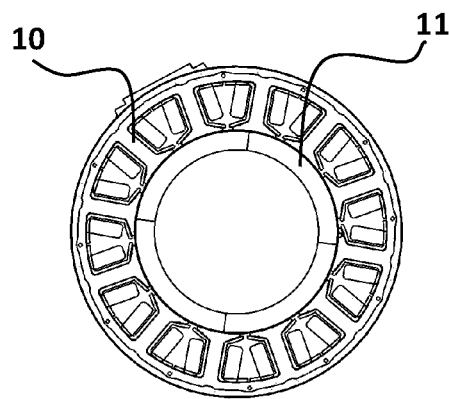
FIGS. 5a and 5b schematically show an external rotor of a Permanent Magnet Synchronous Motor, Radial Flux Type (PMSM-RF) motor and an internal rotor PMSM-RF motor respectively, according to the invention.
Figure 5B:
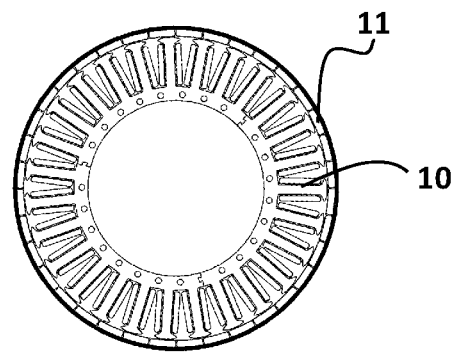

FIGS. 5*a* and 5*b* schematically show an external rotor PMSM-RF motor and an internal rotor PMSM-RF motor respectively, according to the invention. Each comprises a stator 10 comprising coils and a rotor 11 comprising two pole pair permanent magnets 12 carried by the rotor so that the pole to pole physical spacing between all adjacent magnets 12 around the rotor is similar to the internal flux gap within the two pole pair permanent magnets, and thus the flux distribution of each magnetic pole is as symmetric as possible, and motor cogging torque, and vibration and any resulting audible noise are minimized.

Figure 6A:
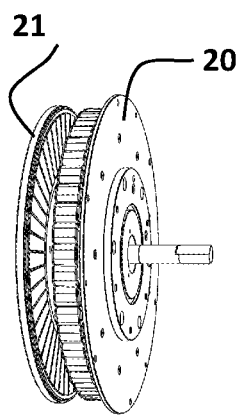
FIGS. 6a-d schematically show a Permanent Magnet Synchronous Motor, Axial Flux Type (PMSM-AF) motors according to the invention.
Figure 6B:
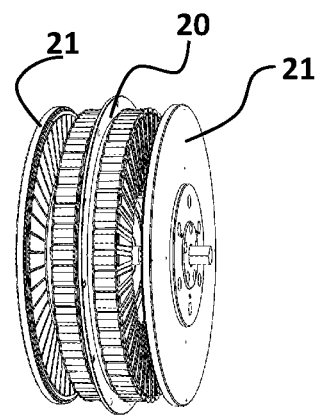
Figure 6C:
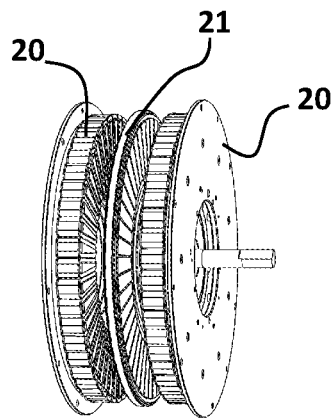
Figure 6D:
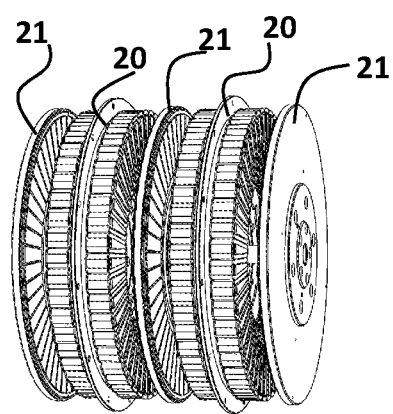

FIGS. 6*a-d* schematically show PMSM-AF motors according to the invention, comprising a stator or stators 20 and rotor or rotors 21. The motor of FIG. 6*a* is a single stator, single rotor motor. The motor of FIG. 6*b* is a double stator, double rotor motor. The motor of FIG. 6*c* is a double stator, single rotor motor. The composite motor of FIG. 6*d* comprises a stack or series of coupled axial flux motors. In each motor the rotor or rotors 21 comprise multi pole pair permanent magnets carried by the rotor so that the pole to pole physical spacing between all adjacent magnets is similar to the internal flux gap within the multi pole pair permanent magnets, so that the flux distribution of each magnetic pole is as symmetric as possible, and motor cogging torque, vibration and noise are minimized.

In a motor according to the invention each multi pole pair permanent magnet may comprise a pair of N-S poles i.e. two poles, or three or more pairs of N-S poles. In each case the internal flux gap within the multiple permanent magnets is similar to the pole to pole physical spacing between adjacent magnets, as described above.

In any motor of the invention the rotor may comprise a relatively light-weight yet rigid polymeric or plastics frame formed for example by injection moulding, with the multi pole permanent magnets being mounted to the rotor frame by overmoulding. In another embodiment the multi pole permanent magnets may be mounted to the rotor frame by bonding to the rotor frame.

The invention has thus far been described with reference to multiple pole pair permanent magnets on the rotor of an electric motor. However the multiple pole pair permanent magnets may instead be on the stator such as on the stator of a DC brushed motor. Thus the invention includes an electric motor comprising a stator comprising the multiple pole pair permanent magnets, and all of the foregoing description of embodiments of the invention applies equally substituting stator for rotor and vice versa.

The invention includes laundry washing machines or dryers or washer-dryers incorporating an electric motor according to the invention, such as top-loading, vertical axis washing machines, front-loading or top or tilt access, horizontal axis laundry washing machines or top-loading, vertical axis laundry washing machines, and laundry dryers or washer-dryers, which are conventionally horizontal access. Typically a laundry machine comprises an outer cabinet with a top or front door, an outer drum, and a rotating inner drum which in use holds the laundry load. Typically the stator of the electric motor of the machine is fixed to one end of the outer drum and the rotor external to the outer drum is rotationally fixed to the outer end of a rotor shaft which extends through a passage in the end of the outer drum and carries the inner drum at its other end. A machine controller and/or motor controller (not shown) provide appropriate commutation signals to stator windings provided around the stator poles so that the rotor's rotational speed and direction may be dictated during the various cycles of a user-set wash programme of the machine.

The foregoing describes the invention including preferred forms thereof. Modifications and alterations as will be obvious to those skilled in the art may be made without departing from the scope of the invention.

The invention claimed is:

1. An electric motor comprising a rotor or stator comprising a plurality of permanent magnets, each of said permanent magnets being a multiple pole pair permanent magnet comprising at least two internal pole pairs adjacent to one another, wherein the multiple pole pair permanent magnets each comprise an internal flux gap within the permanent magnet between adjacent internal pole pairs, and
   wherein the internal flux gap within the multiple pole pair permanent magnets between the internal pole pairs is in the range of about 1 micron to about 3 mm.

2. An electric motor assembly according to claim 1 wherein the internal flux gap within the multiple pole pair permanent magnets between the internal pole pairs is in the range of about 10 microns to 2 mm.

3. An electric motor assembly according to claim 2 wherein the internal flux gap within the multiple pole pair permanent magnets between the internal pole pairs is in the range of about 50 or 100 microns to 1 mm.

4. A laundry washing machine or dryer or washer-dryer including the electric motor according to claim 1.

5. A method for manufacturing an electric motor which comprises producing the rotor or stator of the electric motor so as to incorporate:
   multiple pole pair permanent magnets comprising at least two internal pole pairs adjacent one another, wherein the multiple pole pair permanent magnets each comprise an internal flux gap within the permanent magnets between the internal pole pairs, and/or
   multiple pole pair permanent magnets mounted on the rotor or stator so that an external pole to pole physical spacing between adjacent poles of adjacent magnets is similar to an internal flux gap within the permanent magnets between the internal pole pairs.

6. A laundry washing machine or dryer or washer-dryer including the electric motor produced by the method of claim 5.

7. An electric motor comprising a rotor or stator comprising a plurality of permanent magnets, each of said permanent magnets being a multiple pole pair permanent magnet comprising at least two internal pole pairs adjacent to one another, wherein the multiple pole pair permanent magnets each comprise an internal flux gap within the permanent magnet between adjacent internal pole pairs,
   and wherein the internal flux gap within the multiple pole pair permanent magnets between the internal pole pairs is similar to an external pole to pole physical spacing between adjacent poles of adjacent magnets.

8. An electric motor assembly according to claim 7 wherein the flux distribution of each magnetic pole is substantially symmetric.

9. An electric motor assembly according to claim 7 wherein each multiple pole pair permanent magnet comprises two internal pole pairs.

10. An electric motor assembly according to claim 7 wherein the multiple pole pair permanent magnets are carried by a rotor.

11. An electric motor assembly according to claim 7 wherein the motor is a radial flux- or axial flux- permanent magnet synchronous motor.

12. An electric motor assembly according to claim 7 wherein the motor is a brushed or brushless DC motor.

13. A laundry washing machine or dryer or washer-dryer including the electric motor according to claim 7.

* * * * *